(12) United States Patent
Dörr et al.

(10) Patent No.: US 7,691,941 B2
(45) Date of Patent: Apr. 6, 2010

(54) LOW-SOLVENT OR SOLVENT-FREE CROSSLINKER DISPERSIONS WITH PYRAZOLE-BLOCKED ISOCYANATE GROUPS

(75) Inventors: Sebastian Dörr, Dusseldorf (DE);
Heino Müller, Leverkusen (DE);
Harald Blum, Leverkusen (DE)

(73) Assignee: Bayer Material Science AG (DE)

( * ) Notice: Subject to any disclaimer, the term of this patent is extended or adjusted under 35 U.S.C. 154(b) by 0 days.

(21) Appl. No.: 11/805,696

(22) Filed: May 24, 2007

(65) Prior Publication Data
US 2007/0282062 A1 Dec. 6, 2007

(30) Foreign Application Priority Data
May 31, 2006 (DE) .................. 10 2006 025 313

(51) Int. Cl.
*C08G 18/08* (2006.01)
*C08G 18/81* (2006.01)
*C08J 3/00* (2006.01)
*C08K 3/20* (2006.01)
*C08L 75/00* (2006.01)

(52) U.S. Cl. .............. 524/591; 524/589; 524/590; 524/839; 524/840; 528/45

(58) Field of Classification Search ............ 524/591
See application file for complete search history.

(56) References Cited

U.S. PATENT DOCUMENTS

| 4,203,883 | A | * | 5/1980 | Hangauer, Jr. ............. 524/591 |
| 4,408,008 | A | * | 10/1983 | Markusch ................ 524/591 |
| 4,745,151 | A | | 5/1988 | Noll et al. ................ 524/591 |
| 5,126,393 | A | | 6/1992 | Blum et al. .............. 524/538 |
| 5,280,062 | A | | 1/1994 | Blum et al. .............. 524/591 |
| 5,854,337 | A | * | 12/1998 | Wandelmaier et al. ...... 524/591 |
| 6,063,860 | A | | 5/2000 | Rimmer et al. ............ 524/590 |
| 6,187,860 | B1 | | 2/2001 | König et al. .............. 524/591 |
| 2002/0086115 | A1 | * | 7/2002 | Lamers et al. ........... 427/385.5 |
| 2004/0132909 | A1 | * | 7/2004 | Weikard et al. ........... 525/126 |

FOREIGN PATENT DOCUMENTS

| DE | 199 14 885 A1 | 10/2000 |
| DE | 10260269 | 7/2004 |
| EP | 157 291 B1 | 7/1989 |
| WO | WO-0224778 | 3/2002 |

OTHER PUBLICATIONS

European Search Report and Examination report for related EP application (07010486.4) mailed Jun. 3, 2009.

* cited by examiner

*Primary Examiner*—Marc S Zimmer
*Assistant Examiner*—Noah Frank
(74) *Attorney, Agent, or Firm*—Connolly Bove Lodge & Hutz LLP

(57) ABSTRACT

The present invention relates to the preparation of aqueous, solvent-free or low-solvent, storage-stable polyurethane crosslinker dispersions having pyrazole-blocked isocyanate groups, to coating compositions prepared from them and to their use in coatings.

19 Claims, No Drawings

LOW-SOLVENT OR SOLVENT-FREE CROSSLINKER DISPERSIONS WITH PYRAZOLE-BLOCKED ISOCYANATE GROUPS

CROSS-REFERENCE TO RELATED APPLICATIONS

The present application claims the right of priority under 35 U.S.C. §119(a)-(d) of German Patent Application Number 10 2006 025 313.2, filed May 31, 2006.

BACKGROUND OF THE INVENTION

The present invention relates to the preparation of aqueous, solvent-free or low-solvent, storage-stable PU crosslinker dispersions having pyrazole-blocked isocyanate groups, to coating compositions prepared from them and to their use in coatings.

Recent years have seen a sharp rise in the profile of aqueous paints and coating compositions in the wake of increasingly stringent emissions directives governing the solvents released during paint application. Although for many fields of application there are now aqueous paint systems already available, these systems are often unable to attain the high quality level of conventional, solvent-borne paints with respect to solvent resistance and chemical resistance, elasticity and mechanical durability.

Even water-borne paint systems, based on aqueous polyurethane dispersions, frequently still contain considerable amounts of solvents. The complete elimination of these solvents is generally not possible for polyurethane dispersions, since the preparation of such dispersions via prepolymers often necessitates solvents, or it is often necessary to add what is called a cosolvent (coalescence agent) to the dispersions in order to achieve a reduction in the minimum film-forming temperature. The cosolvent ensures that when a film is formed of the coating compositions, even at or below room temperature, coats are formed which are sufficiently hard. In addition, in the absence of solvents, the polyurethane dispersions and the paint formulations frequently lack storage stability.

The solvent N-methylpyrrolidone (NMP) in particular is in widespread use in the field of aqueous dispersions and paints. For example, the carboxylic acid-hydrophilicized polyisocyanate crosslinker dispersions with dimethylpyrazole-blocked isocyanate groups described in EP-A 0942023 contain NMP as a cosolvent.

Cosolvent-free preparation of the dimethylpyrazole-blocked polyisocyanate crosslinker described in EP-A 0942023, by elimination of the solvent, is not possible, due to the increase in viscosity.

The nonionically hydrophilicized polyisocyanate crosslinker dispersions with pyrazolically blocked isocyanate groups that WO 1997012924 describes contain approximately 7% butyl glycol as cosolvent. Butyl glycol, similarly to NMP, is distinguished by a relatively high boiling point. Its removal in order to prepare solvent-free dispersions is not possible.

DE 19 914 885 describes polyurethane dispersions having dimethylpyrazole-blocked isocyanate groups for preparing glass fibre sizes. These dispersions are prepared using an organic solvent, which after dispersion in water, is removed from the dispersion by distillation. Example 1 describes the preparation in a 62 percent strength by weight acetonic solution. These dispersions are constructed using polyol components having molecular weights of at least 350 g/mol in a fraction of 30% to 90% of the prepolymer. As a result of the high fraction of soft segments, the dispersion as described cannot be used as a crosslinker component for high-value coating compositions, since the paints are unable to attain sufficient hardness es.

DE 3 613 492 describes an acetone process for preparing cosolvent-free polyurethane-polyurea dispersions. The prepolymer, which in this case is not blocked, is prepared in a 20 to 50 percent strength by weight solution in a volatile organic solvent, such as acetone, and following dispersion in water, the solvent is removed by distillation.

The replacement of NMP in the process of EP-A 0942023 by acetone in amounts of 50 or 62% by weight, as in DE 19914885, leads to dimethylpyrazole-blocked polyisocyanate crosslinkers which, are not storage-stable.

The object of the present invention, then, is to provide storage-stable polyurethane dispersions having pyrazole-blocked isocyanate groups in a similar way to that in which they can be obtained in accordance with EP-A 0 942 023, but which are solvent-free or low in solvent and in particular do not contain NMP or butyl glycol. Furthermore, the coatings produced from these dispersions should have good film optical properties, good chemical resistance and pendulum hardnesses of more than 80 seconds.

SUMMARY OF THE INVENTION

It has now been found that this object can be achieved by means of a specific preparation process. The invention provides a process for preparing dispersions of blocked polyurethane prepolymers, comprising I) preparing a blocked polyurethane prepolymer by reacting
 a) 100 equivalent % of at least one polyisocyanate with
 b) 50 to 90 equivalent %, based on the isocyanate-reactive groups, of a thermally eliminable blocking agent,
 c) 5 to 45 equivalent %, based on the isocyanate-reactive groups, of a monohydroxycarboxylic acid as hydrophilicizing agent
 d) 0 to 25 equivalent %, based on the isocyanate-reactive groups, of a polyhydroxycarboxylic acid as hydrophilicizing agent and
 e) 0 to 15 equivalent %, based on the isocyanate-reactive groups, of a chain extender component which is at least, based on isocyanate-reactive groups, difunctional or polyfunctional and has a molecular weight of 32 to 350 g/mol,
 wherein
  i) step I) takes place using (partly) water-miscible organic solvents which are inert towards NCO groups and have boiling points below 120° C. (at 1013 mbar), and
  ii) components a)-e) and the organic solvents are used in an amount such that the polyurethane prepolymer in the reaction solution is present, following complete reaction, in an amount of 70% to 98% by weight,
II) deprotonating, at least partially, the carboxylic acid groups with a base before, during or after step III),
III) dispersing the polyurethane prepolymer solution obtained from step (I) in water, and
IV) distilling the dispersion to completely remove the organic solvent, the distillation occurring during or after step III).

The invention further provides dispersions obtainable by the process of the invention.

DETAILED DESCRIPTION OF THE PREFERRED EMBODIMENTS

"Completely remove", in the above context, and in the claims, means that after the distillation less than 5 percent by weight of the solvent remains in the dispersion, preferably less than 3 percent by weight, more preferably less than 1.5 percent by weight.

The proportions of the reaction partners are preferably selected such that the equivalent ratio of the isocyanate component a) to isocyanate-reactive groups of components b), c), d) and e) is 1:0.5 to 1:1.7, more preferably 1:0.6 to 1:1.5 and very preferably 1:0.7 to 1:1.3.

Suitable polyisocyanates used in a) are the NCO-functional compounds with a functionality of preferably 2 or more that are known to one skilled in the art. These are typically aliphatic, cycloaliphatic, araliphatic and/or aromatic di- or triisocyanates and also their higher molecular mass derivatives with imino-oxadiazinedione, isocyanurate, uretdione, urethane, allophanate, biuret, urea, oxadiazinetrione, oxazolidinone, acylurea and/or carbodiimide structures, the derivatives also having two or more free NCO groups.

Examples of such di- or triisocyanates are tetramethylene diisocyanate, cyclohexane 1,3- and 1,4-diisocyanate, hexamethylene diisocyanate (HDI), 1-isocyanato-3,3,5-trimethyl-5-isocyanato-methylcyclohexane (isophorone diisocyanate, IPDI), methylene-bis(4-isocyanatocyclohexane), tetramethylxylylene diisocyanate (TMXDI), triisocyanatononane, tolylene diisocyanate (TDI), diphenylmethane-2,4'- and/or 4,4'-diisocyanate (MDI), triphenylmethane 4,4'-diisocyanate, naphthylene-1,5-diisocyanate, 4-isocyanatomethyloctane 1,8-diisocyanate (nonane triisocyanate, triisocyanatononane, TIN) and/or 1,6,11-undecane triisocyanate and also any desired mixtures thereof and, optionally, also mixtures of other di-, tri- and/or polyisocyanates.

Such polyisocyanates typically have isocyanate contents of 0.5 to 50% by weight, preferably 3 to 30% by weight, more preferably 5% to 25% by weight.

Particular preference is given to using the higher molecular mass compounds having isocyanurate, urethane, allophanate, biuret, iminooxadiazinedione, oxadiazinetrione and/or uretdione groups that are based on aliphatic and/or cycloaliphatic diisocyanates.

Particular preference is given to using the higher molecular mass compounds having biuret, iminooxadiazinedione, isocyanurate and/or uretdione groups that are based on hexamethylene diisocyanate, isophorone diisocyanate and/or 4,4'-diisocyanatodicyclohexylmethane.

Blocking agents of component b) that are preferably used are 1H-pyrazoles, such as pyrazole, 3-methylpyrazole or 3,5-dimethylpyrazole for example. With particular preference 3,5-dimethylpyrazole is used, being readily obtainable, for example, by condensation of hydrazine hydrate with acetylacetone. Additionally mixtures of these blocking agents and mixtures with other blocking agents such as butanone oxime, acetone oxime, N-tert-butylbenzylamine and/or diisopropylamine, for example, can be used.

Suitable monohydroxycarboxylic acids of component c) are for example 2-hydroxy acetic acid, 3-hydroxypropanoic acid, 12-hydroxy-9-octadecanoic acid (ricinoleic acid), hydroxypivalic acid (2-hydroxymethyl-2-methylpropionic acid) or lacetic acid. Preference is given to hydroxypivalic acid.

Suitable polyhydroxycarboxylic acids of component d) are for example dihydroxycarboxylic acids such as dimethylol acetic acid, 2,2-dimethylolbutyric acid, 2,2-dimethylolpentanoic acid, dihydroxysuccinic acid, dimethylolbutyric acid or dimethylolpropionic acid. Preference is given to dimethylolpropionic acid.

In addition to the hydrophilicization by means of at least one hydroxycarboxylic acid it is additionally possible to use suitable compounds having a nonionically hydrophilicizing action. Suitable nonionically hydrophilicizing compounds are, for example, polyoxyalkylene ethers which contain at least one hydroxyl or amino group. These polyethers are obtainable in a conventional manner by alkoxylation of suitable starter molecules.

Examples of suitable starter molecules are saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxy-methyloxetane or tetrahydrofurfuryl alcohol, diethylene glycol monoalkyl ethers, such as diethylene glycol monobutyl ether, for example, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclo-hexylamine, and heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides suitable for the alkoxylation reaction are, in particular, ethylene oxide and propylene oxide, which can be used in any order or else in a mixture for the alkoxylation reaction. Preference is given to the blockwise addition of ethylene oxide and propylene oxide onto the starter.

The polyalkylene oxide polyethers are either simple polyethylene oxide polyethers or mixed polyalkylene oxide polyethers at least 30 mol %, preferably at least 40 mol %, of whose alkylene oxide units are composed of ethylene oxide units. Preferred non-ionic compounds are monofunctional mixed polyalkylene oxide polyethers which contain at least 40 mol % of ethylene oxide units and not more than 60 mol % of propylene oxide units.

The amount of ethylene oxide units in terms of the total solids content of components a) to e) is below 5% by weight, preferably below 3% by weight, more preferably below 2% by weight.

Examples of suitable chain extender components e) include di-, tri- and/or polyols. Examples are ethanediol, di-, tri-, tetraethylene glycol, 1,2-propanediol, di-, tri-, tetrapropylene glycol, 1,3-propanediol, butane-1,4-diol, butane-1,3-diol, butane-2,3-diol, pentane-1,5-diol, hexane-1,6-diol, 2,2-dimethyl-1,3-propanediol, 1,4-dihydroxycyclohexane, 1,4-dimethylolcyclohexane, octane-1,8-diol, decane-1,10-diol, dodecane-1,12-diol, trimethylol ethers, trimethylolpropane, castor oil, glycerol and/or mixtures of said products, optionally with further di-, tri- and/or polyols. Additionally, ethoxylated and/or propoxylated di-, tri- and/or polyols such as ethoxylated and/or propoxylated trimethylolpropane, glycerol and/or hexane-1,6-diol, for example can be used.

In addition it is possible to use di-, tri- and/or polyamines having primary and/or secondary amino groups. Examples are ethylenediamine, 1,3-propylenediamine, 1,6-hexamethylenediamine, isophoronediamine, 4,4'-diaminodicyclohexylmethane, diethylenetriamine or hydrazine.

It is also possible, furthermore, to use hydroxides, such as adipic dihydroxide, for example.

Mixtures of amines and alcohols are possible as well, and compounds of mixed functionality with different isocyanate-reactive groups can be used, such as N-methylethanolamine and N-methylisopropanolamine 1-aminopropanol, diethanolamine, 1,2-hydroxyethanethiol or 1-aminopropanethiol, for example.

Preferred chain extenders are butane-1,4-diol, butane-1,3-diol, hexane-1,6-diol and/or trimethylolpropane. The chain extenders of component e) preferably possess a molecular weight of 32 to 350 g/mol, more preferably of 62 to 200 g/mol.

In order to accelerate the urethanization, it is also possible to add catalysts to the reaction mixture. Examples of suitable catalysts include tertiary amines, compounds of tin, of zinc or of bismuth, or basic salts. Dibutyltin dilaurate and dibutyltin octoate are preferred.

As (partly) water-miscible solvents of component i) suitability is possessed by aliphatic ketones or aliphatic or cycloaliphatic ethers. Examples of such solvents are acetone, methyl ethyl ketone, tert-butyl methyl ether or tetrahydrofuran.

Aliphatic ketones having 3 to 6 carbon atoms are preferred. Acetone is particularly preferred.

Likewise possible is the use of mixtures of the solvents in question.

The solvent is used in an amount such that the polyurethane polymer contained the reaction solution is present in an amount of 70% to 98% by weight, preferably 80% to 95% by weight.

The solvent can be added in portions or all at once. In each step the addition may be made prior to dispersion. In one preferred version the solvent is added after some of the isocyanate groups have reacted but while free isocyanate groups are still present.

The distillative removal of the solvent is accomplished preferably in vacuo.

The advantage of this procedure lies in a reduced viscosity for the preparation of the prepolymer, without the solvent being present in sizeable amounts in the dispersion.

Examples of deprotonating agents for use in step II) are basic compounds such as ammonia, triethylamine, N,N-dimethylaminoethanol, dimethylcyclohexylamine, triethanolamine, methyldiethanolamine, diisopropanolamine, ethyldiiso-propylamine, diisopropylcyclohexylamine, N-methylmorpholine, 2-amino-2-methyl-1-propanol or any desired mixtures thereof. Preferred deprotonating agents are 2-amino-2-methyl-1-propanol and tertiary amines such as triethylamine and N,N-dimethylethanolamine, and N,N-dimethylethanolamine is particularly preferred.

The amount of deprotonating agent used is generally calculated such that the degree of deprotonation of the carboxylic acid groups present in the polyurethanes of the invention (molar ratio of amine employed to acid groups present) is at least 40%, preferably 70% to 130%, more preferably 90% to 110%. This deprotonation can take place before, during or after the dispersion step. Preference is nevertheless given to deprotonation prior to the addition of water.

For dispersion in water in accordance with step III), either the polyurethane prepolymer solution is introduced into the dispersing water, optionally under strong shearing, such as vigorous stirring, for example, or conversely, the dispersing water is stirred into the prepolymer solutions. With preference the water is added to the dissolved prepolymer.

After the end of dispersion, in step IV) the solvent is completely removed (as defined above) by distillation. The distillation takes place preferably in vacuo at temperatures of 20 to 70° C., more preferably of 30 to 50° C. The vacuum is preferably set in a range from 50 to 500 mbar, more preferably in a range from 100 to 200 mbar. It is possible in this case first to set the desired temperature and to adapt the vacuum necessary for distillation, or vice versa. In a preferred procedure, a vacuum in the range from 100 to 200 mbar is set to start with and the dispersion is then warmed from room temperature to 40° C.

In one preferred embodiment of the process of the invention the polyisocyanate (component I)a)) is introduced initially and to start with is partly blocked with a portion of the DMP (blocking agent as per component I)b)) in a first reaction stage at temperatures around 70° C. Preferably 25 to 60 equivalent % of the isocyanate groups are reacted in this first step. Subsequently, directly one after the other, the remaining isocyanate-reactive components and the solvent are added and the reaction mixture is heated at reflux until isocyanate groups are no longer detectable. In the preferred embodiment, the acid groups are then deprotonated in whole or in part using a base followed by dispersion in water and then by removal of the acetone in vacuo.

The dispersions of the invention have an average particle diameter (determined for example by means of LCS measurements, measurement at 23° C. following dilution of the sample in approximately 100 times the volume of deionized water, instrument: Malvern Zetasizer 1000, Malvern Instr. Limited) of 5 to 300 nm, preferably of 10 to 150 nm. This applies to at least 90% of the particles, preferably at least 75%, more preferably at least 60%.

The solids content of the dispersions is preferably 20% to 55% by weight, more preferably 25% to 45% by weight.

The blocked polyisocyanate dispersions of the invention can be used, for example, for preparing bakeable coating compositions (baking varnishes), for coating substrates, preferably made of metals, minerals, glass, wood or plastics. For this purpose the coating materials of the invention can be applied by spreading, knife coating, dipping, spray application such as compressed-air spraying or airless spraying, and also by means of electrostatic application, such as high-speed rotating bell application, for example. The dry film thickness may lie, for example, at 10 to 120 μm. The dried films are cured by baking in the temperature range from 90 to 190° C., preferably 110 to 180° C., more preferably 120 to 160° C.

The invention accordingly further provides for the use of the blocked polyurethane prepolymer dispersions of the invention for preparing coating materials, adhesives and sealants and elastomers.

The invention further provides coating materials, adhesives and sealants, and elastomers, obtainable using the dispersions of the invention.

The invention further provides substrates provided with coatings obtainable using coating materials of the invention.

In order to prepare coating materials (baking varnishes), adhesives and elastomers it is possible for the polyisocyanate crosslinker dispersions of the invention having blocked isocyanate groups to be mixed with at least difunctional isocyanate-reactive compounds, examples being any desired polyol components, preferably in the form of aqueous dispersions.

Such polyol components may be polyhydroxypolyesters, polyhydroxypolyurethanes, polyhydroxypolyethers, polycarbonate-diols or hydroxyl-containing addition polymers, examples being the conventional polyhydroxypolyacrylates, polyacrylate-polyurethanes and/or polyurethane-polyacrylates. These components generally have a hydroxyl number of 20 to 200, preferably of 50 to 130 mg KOH/g. The hydrophilic modification typically necessary to these polyhydroxyl compounds in order to prepare dispersions is accomplished by conventional methods, of the kind disclosed for example in EP-A-0 157 291, EP-A-0 498 156 or EP-A-0 427 028.

Also possible is a mixture of other alcohol-reactive compounds such as, for example, amino crosslinker resins such as, for example, melamine resins and/or urea resins for additional crosslinking during baking.

The preparation of the paints, inks, adhesives and other formulations from the dispersions of the invention is accomplished by conventional methods. Apart from the blocked polyisocyanates and polyols, it is possible for the formulations to have added to them typical additives and other auxiliaries (examples being pigments, fillers, flow control agents, defoamers, catalysts).

EXAMPLES

Chemicals

Desmodur® N 3300:

Isocyanurate based on hexamethylene diisocyanate, Bayer MaterialScience AG, Leverkusen, Del.

Desmodur® W:

4,4'-Diisocyanatodicyclohexylmethane, Bayer MaterialScience AG, Leverkusen, Del.

Bayhydrol® D 270

Hydroxyl-containing aqueous polyester dispersion, Bayer MaterialScience AG, Leverkusen, Del.

Additol XW 395

Flow control assistant/defoamer, UCB Chemicals, St. Louis, USA

Surfynol 104

Flow control assistant/defoamer, Air Products, Hattingen, Del.

Hydroxypivalic Acid

Perstorp Specialty Chemicals AB, Perstorp, Sweden

The further chemicals were purchased from the chemical trade (Sigma-Aldrich Chemie GmbH, Taufkirchen, DE).

Unless noted otherwise, all percentages are by weight.

Unless noted otherwise, all analytical measurements relate to temperatures of 23° C.

The reported viscosities were determined by means of rotational viscometry in accordance with DIN 53019 at 23° C. using a rotational viscometer from Anton Paar Germany GmbH, Ostfildern, DE.

NCO contents, unless expressly mentioned otherwise, were determined volumetrically in accordance with DIN-EN ISO 11909.

The particle sizes reported were determined by means of laser correlation spectroscopy (instrument: Malvern Zetasizer 1000, Malvern Instr. Limited).

The solids contents were determined by heating a weighed sample at 120° C. When constant weight was reached, the sample was weighed again to allow calculation of the solids content.

Monitoring for free NCO groups was carried out by means of IR spectroscopy (band at 2260 cm$^{-1}$).

As a storage test, 250 ml portions of the dispersion were dispensed and stored either at room temperature or at 40° C. The respective storage time period is reported for the individual examples. The value determined for the stability was the height of the sediment, based on a vessel with a base area of 25 cm$^2$. Above a height of 0.5 mm, the dispersion was considered not to be stable.

1) Comparative Example 1

Crosslinker Dispersion, Not Inventive, Preparation as Per Example 1 in EP-A 0942023, but without NMP, without Cosolvent A standard stirred apparatus was charged with 200 g (1 eq) of Desmodur N 3300 and this initial charge was heated to 50° C. under nitrogen. Then a portion of the 3,5-dimethylpyrazole (DMP) (48.0 g; 0.5 eq) was added to the melt over the course of 30 minutes in portions. The melt was stirred at 70-80° C. until an isocyanate content of approximately 8.5% was reached.

The melt was admixed with 29.0 g (0.25 eq) of hydroxypivalic acid and stirred at 65° C. until an isocyanate content of 3.8% was reached.

Subsequently a further 24.0 g (0.25 eq) DMP were added and the batch was stirred at 65° C. until isocyanate groups were not longer detectable by IR spectroscopy. At this point the prepolymer became very viscous and wound itself partly around the stirrer.

Then 22.2 g (0.25 eq) of N,N-dimethylethanolamine were added, stirring was carried out for 10 minutes, and with vigorous stirring 451.4 g of deionized water at 70° C. were added.

The properties of the resulting dispersion were as follows:

| | |
|---|---|
| solids content: | about 38% |
| pH: | about 8.4 |
| viscosity | about 400 mPas |
| average particle size (LCS): | 74 nm |

Storage test: significant sediment formed on 40° C. storage after a few days and at room temperature after two weeks.

The dispersion was not storage-stable. Moreover, the preparability was problematic as a result of the high viscosity of the prepolymer.

2) Comparative Example 2

Crosslinker Dispersion, Not Inventive, Preparation as per Example 1 in EP-A 0942023, but without NMP, by the Acetone Process (50% Strength Solution of the Prepolymer in Acetone)

A standard stirring apparatus was charged with 200 g (1 eq) of Desmodur N 3300 and this initial charge was heated to 50° C. under nitrogen. Then a portion of the 3,5-dimethylpyrazole (DMP) (48.0 g; 0.5 eq) was added to the melt over the course of 30 minutes in portions. The melt was stirred at 70-80° C. until an isocyanate content of approximately 8.5% was reached. The melt was admixed with 29.0 g (0.25 eq) of hydroxypivalic acid and 302 g of acetone and was stirred at 50-65° C. until an isocyanate content of 1.8% was reached.

Subsequently a further 24.0 g (0.25 eq) of DMP were added and stirring was continued until isocyanate groups were no longer detectable by IR spectroscopy.

Then 22.2 g (0.25 eq) of N,N-dimethylethanolamine were added, followed by stirring for 10 minutes, and the addition with vigorous stirring of 451.4 g of deionized water with a temperature of 50° C.

Following removal of the acetone, distillation was carried out in vacuo (120 mbar) at approximately 40° C. The product was not a dispersion; instead a large amount of a white sediment was formed.

3) Comparative Example 3

Crosslinker Dispersion as per Comparative Example 2, but with an Increased Solids Content in the Prepolymer

The procedure described in Comparative Example 2 was repeated, using a 62% strength solution rather than a 50% strength solution of the prepolymer in acetone.
In this case as well no stable dispersion was formed.

4) Inventive Example 1

Crosslinker Dispersion, Inventive, Preparation as per Example 1 in Ep-α 0942023, but without NMP, Preparation with a Little Acetone (95% Strength Solution of the Prepolymer in Acetone)

The procedure described in Comparative Example 1 was repeated, but adding 16 g of acetone together with the hydroxypivalic acid. After the deionized water had been added, the acetone was removed by distillation in vacuo (120 mbar) at approximately 40° C.
The properties of the finely divided dispersion obtained were as follows:

| | |
|---|---|
| solids content: | about 39% |
| pH: | about 8.4 |
| viscosity | about 9600 mPas |
| average particle size (LCS): | 36 nm |

Storage test: stable for at least 3 months at room temperature and at 40° C.

5) Inventive Example 2

Crosslinker Dispersion, Inventive, Preparation as per Example 1 (85% Strength Solution of the Prepolymer in Acetone)

The procedure described in Comparative Example 1 was repeated, but adding 45 g of acetone together with the hydroxypivalic acid. After the deionized water had been added, the acetone was removed by distillation in vacuo (120 mbar) at approximately 40° C.
The properties of the finely divided dispersion obtained were as follows:

| | |
|---|---|
| solids content: | about 39% |
| pH: | about 8.7 |
| viscosity | about 1300 mPas |
| average particle size (LCS): | 38 nm |

Storage test: stable for at least 3 months at room temperature and at 40° C.

6) Inventive Example 3

Crosslinker Dispersion, Inventive, Preparation as per Example 1 (70% Strength Solution of the Prepolymer in Acetone)

The procedure described in Comparative Example 1 was repeated, but adding 129 g of acetone together with the hydroxypivalic acid. After the deionized water had been added, the acetone was removed by distillation in vacuo (120 mbar) at approximately 40° C.
The properties of the finely divided dispersion obtained were as follows:

| | |
|---|---|
| solids content: | about 38% |
| pH: | about 8.9 |
| viscosity | about 165 mPas |
| average particle size (LCS): | 22 nm |

Storage test: stable for at least 3 months at room temperature and at 40° C.

7) Example 4

Crosslinker Dispersion, Inventive, Chain Extension by Diol Component, Preparation with a Little Acetone (90% Strength Solution of the Prepolymer in Acetone)

A standard stirred apparatus was charged with 429.0 g (2.2 eq) of Desmodur N 3300 and this initial charge was heated to 70° C. under nitrogen. Then a portion of the DMP (76.9 g; 0.8 eq) was added to the melt over the course of 30 minutes in portions. The melt was stirred at 70° C. until the theoretical isocyanate content of 11.62% is reached or a value below that is reached.

The following components were added, directly one after another, to the melt: 63 g of acetone; 11.8 g (0.2 eq) of 1,6-hexanediol; 47.2 g (0.4 eq) of hydroxypivalic acid; and a further 57.7 g (0.6 eq) of DMP. The mixture was then stirred at reflux until isocyanate groups were no longer detectable by IR spectroscopy. Then 39.2 g (0.44 eq) of N,N-dimethylethanolamine were added, followed by stirring for 10 minutes and the addition of 976.6 g of deionized water with a temperature of 50° C., with vigorous stirring. The acetone was removed by distillation in vacuo (120 mbar) at approximately 40° C. and the dispersion was then stirred at this temperature for 3 hours more.

The properties of the finely divided dispersion obtained were as follows:

| | |
|---|---|
| solids content: | about 37% |
| pH: | about 8.7 |
| viscosity | about 1000 mPas |
| average particle size (LCS): | 14 nm |

Storage test: stable for at least 3 months at room temperature and at 40° C.

8) Example 5

Crosslinker dispersion, Inventive, Chain Extension by Triol Component, Preparation with a Little Acetone (90% Strength Solution of the Prepolymer in Acetone)

The procedure described in inventive Example 4 was repeated, but instead of hexanediol the corresponding amount of OH groups was added through trimethylolpropane.
The properties of the finely divided dispersion obtained were as follows:

| | |
|---|---|
| solids content: | about 37% |
| pH: | about 8.9 |
| viscosity | about 3000 mPas |
| average particle size (LCS): | 14 nm |

Storage test: stable for at least 3 months at room temperature and at 40° C.

9) Inventive Example 6

Crosslinker Dispersion, Inventive, Chain Extension by Triol Component, as Example 5 but Mixture of Different Polyisocyanates

The procedure described in inventive Example 5 was repeated, but adding, instead of Desmodur N 3300, a mixture of 174.0 g of Desmodur N 3300 and 26 g of Desmodur W.

The properties of the finely divided dispersion obtained were as follows:

| | |
|---|---|
| solids content: | about 37% |
| pH: | about 9.0 |
| viscosity | about 950 mPas |
| average particle size (LCS): | 20 nm |

Storage test: stable for at least 3 months at room temperature and at 40° C.

10) Inventive Example 7

Crosslinker Dispersion, Inventive, Mixed Hydrophilicization from Hydroxypivalic Acid and Dimethylolpropionic Acid, Preparation with a Little Acetone (90% Strength Solution of the Prepolymer in Acetone)

The procedure described in inventive Example 5 was repeated, but with the hexanediol replaced by a corresponding amount of OH groups from dimethylolpropionic acid (13.4 g), and the fraction of hydroxypivalic acid was reduced by 25%.

The properties of the finely divided dispersion obtained were as follows:

| | |
|---|---|
| solids content: | about 37% |
| pH: | about 8.9 |
| viscosity | about 3500 mPas |
| average particle size (LCS): | 13 nm |

Storage test: stable for at least 3 months at room temperature and at 40° C.

TABLE 1

Performance test
(Amounts in grams)
Preparation of paint formulations, baking and testing of clear varnishes

| Dispersion | from Ex. 4 | from Ex. 6 | from Ex. 7 | * |
|---|---|---|---|---|
| Amount of dispersion | 68.6 | 70.0 | 65.7 | 66.8 |
| Bayhydrol ® D 270 | 50.0 | 50.0 | 50.0 | 50.0 |
| Additol XW 395 | 1.1 | 1.1 | 1.1 | 1.1 |
| Surfynol 104 | 1.1 | 1.1 | 1.1 | 1.1 |
| Distilled water | 66.3 | 58.0 | 57.0 | 69.0 |
| Solids in paint [%] | 34.6 | 34.1 | 34.1 | 31.9 |
| Flow time of paint formulation [s][3] | 37 | 41 | 37 | 39 |
| Baking conditions | 10'RT + 20'140° C. | 10'RT + 20'140° C. | 10'RT + 20'140° C. | 10'RT + 20'140° C. |
| Film optical properties (visual test) | o.k. | o.k. | o.k. | o.k. |
| Pendulum hardness [s][2] | 95 | 127 | 139 | 70 |
| Initial dissolubility[1] | 2/2/3/4 | 2/2/3/4 | 2/2/3/4 | 2/3/4/4 |

*Bayhydur ® VP LS 2310, commercial aqueous dispersion of a polyisocyanate blocked with butanone oxime, solids content 38%, Bayer MaterialScience AG, Leverkusen, DE.
[1] 1 minute, sequence of solvents as follows: xylol/methoxypropyl acetate/ethyl acetate/acetone: assessment: 0 very good to 5 poor A chemical resistance of 4 or less in respect of the solvents described was necessary.
[2] The pendulum hardnesses were measured by the method of Konig in accordance with DIN 53157. A pendulum hardness of at least 80 seconds was necessary.
[3] The flow time was determined in accordance with DIN 53 211.

Conducting analogous tests with the comparable examples was not possible since at the beginning of testing these comparative examples already contained a considerable sediment. This sediment prevented reliable paint testing through performance tests.

It is found that the polyisocyanate dispersions of the invention are storage-stable and that the bakeable coating compositions of the invention meet the criteria with regard to film optical qualities, chemical resistance and pendulum hardnesses.

The coating material comprising the crosslinker Bayhydur® VP LS 2310 has a variety of drawbacks over the coating materials comprising the crosslinkers of the invention (low solids in the coating formulation at comparable flow time, poorer chemical resistance, lower film hardness).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. Process for preparing dispersions of blocked polyurethane prepolymers, comprising
I) preparing a blocked polyurethane prepolymer by reacting
(a) 100 equivalent % of at least one polyisocyanate having a functionality of >2, with
b) 50 to 90 equivalent %, based on the isocyanate-reactive groups, of a thermally eliminable blocking agent,
c) 5 to 45 equivalent %, based on the isocyanate-reactive groups, of a monohydroxycarboxylic acid as hydrophilicizing agent
d) 0 to 25 equivalent %, based on the isocyanate-reactive groups, of a polyhydroxycarboxylic acid as hydrophilicizing agent and
(e) greater than 0 to 15 equivalent %, based on the isocyanate-reactive groups, of a chain extender component which is at least, based on isocyanate-reactive groups, trifunctional or higher and has a molecular weight of 32 to 350 g/mol, wherein i) step I) takes place using (partly) water-miscible organic solvents which are inert towards NCO groups and have boiling points below 120° C. (at 1013 mbar), and ii) components a)-e) and the organic solvents are used in an amount such that the polyurethane prepolymer in the reaction solution is present, following complete reaction, in an amount of 70% to 98% by weight, II) deprotonating, at least partially, the carboxylic acid groups with a base before, during or after step III), III) dispersing the polyurethane prepolymer solution obtained from step (I) in water, and IV) distilling the dispersion to completely remove the organic solvent, the distillation occurring during or after step III).

2. Process for preparing dispersions of blocked polyurethane prepolymers according to claim 1, wherein, the polyisocyanates are polyisocyanates based on compounds selected from the group consisting of hexamethylene diisocyanate, isophorone diisocyanate, 4,4'-diisocyanatodicyclohexylmethane and mixtures thereof.

3. Process for preparing dispersions of blocked polyurethane prepolymers according to claim 1, wherein the blocking agents are 1H-pyrazoles.

4. Process for preparing dispersions of blocked polyurethane prepolymers according to claim 1, wherein, the monohydroxycarboxylic acid is hydroxypivalic acid.

5. Process for preparing dispersions of blocked polyurethane prepolymers according to claim 1 wherein the polyhydroxycarboxylic acid is dimethylolpropionic acid.

6. Process for preparing dispersions of blocked polyurethane prepolymers according to claim 1 wherein the chain extender is trimethylolpropane.

7. Process for preparing dispersions of blocked polyurethane prepolymers according to claim 1, wherein the (partly) water-miscible solvents are aliphatic ketones having 3 to 6 carbon atoms.

8. Process for preparing dispersions of blocked polyurethane prepolymers according to claim 1, wherein the base utilized in step II) is selected from the group consisting of 2-amino-2-methyl-1-propanol, triethylamine, N,N-dimethylethanolamine and mixtures thereof.

9. Process for preparing dispersions of blocked polyurethane prepolymers according to claim 1, wherein in step IV), the solvent is removed from the dispersion down to a level of less than 3 percent by weight.

10. Process for preparing dispersions of blocked polyurethane prepolymers according to claim 1, wherein the equivalent ratio of the isocyanate component I)a) to isocyanate reactive groups of components I)b), c), d) and e) is 1:0.5 to 1:1.7.

11. Process for preparing dispersions of blocked polyurethane prepolymers according to claim 1, wherein step II) is performed prior to step III).

12. Dispersions of blocked polyurethane prepolymers obtained by a process according to claim 1.

13. Compositions comprising blocked polyurethane prepolymer dispersions according to claim 12, the compositions selected from the group consisting of coating compositions, adhesives, sealants, and elastomers.

14. Substrates provided with coatings obtained using dispersions according to claim 12.

15. The process according to claim 1, wherein there is no N-methylpyrrolidone (NMP) or butyl glycol used.

16. The process according to claim 1, wherein said chain extender component has a functionality, based on isocyanate-reactive groups, of greater than three.

17. The process according to claim 1, wherein said chain extender component is, based on isocyanate-reactive groups, trifunctional.

18. Process for preparing dispersions of blocked polyurethane prepolymers according to claim 1, wherein the equivalent ratio of the isocyanate component I)a) to isocyanate reactive groups of components I)b), c), d) and e) is 1:0.7 to 1:1.3.

19. The compositions according to claim 13, wherein the compositions are coating compositions which have a pendulum hardness of more than 80 seconds.

* * * * *